Dec. 19, 1933.    C. F. NIELSEN    1,940,180
BRUSH FOR PUTTING ON TOOTH PASTE, CREAM, AND THE LIKE

Filed Nov. 24, 1931

Inventor
Christian Fr. Nielsen
By Attorney
Peter M. Bour

Patented Dec. 19, 1933

1,940,180

UNITED STATES PATENT OFFICE 1,940,180

BRUSH FOR PUTTING ON TOOTH PASTE, CREAM, AND THE LIKE

Christian Frederik Nielsen, Reykjavik, Iceland

Application November 24, 1931, Serial No. 577,005, and in Germany May 7, 1931

3 Claims. (Cl. 15—133)

This invention relates to so-called fountain-brushes, and in particular to such brushes of the said kind, which are to be used as tooth brushes, or as shoe-cream brushes, or for similar purposes.

The object of the invention is to provide a new and improved fountain-brush of the kind in which the pasty substance, such as shoe-cream, soap-cream and tooth-paste, is contained in the hollow handle of the brush and in a cream-container screwed on to the handle at the grip-end of the latter, and in which, by screwing the container gradually more and more tight on to the handle, the paste is pressed through the hollow handle and through holes at the brush end of the handle directly in between the bristles of the brush-head. It is further the object of the invention to provide a fountain-brush of the said kind, which is extremely simple in its construction, so that it may be manufactured and marketed at an extremely low price.

It is furthermore the object of the invention to provide in particular a tooth brush, which is superior to other tooth brushes of the same kind or type, by being absolutely hygienic, because, owing to its particular construction, it can be cleaned most easily, not only as to its outside, but likewise as to its inner cream or paste containing ducts.

In order to obtain these objects, I have devised a handle so as to have an inner bore of absolutely uniform size extending from the one end of the handle to the other, so that for the purpose of inner cleaning the said bore can be swept or wiped perfectly clear in a single pushing movement of the cleaning tool. Another characteristic feature of my new and improved fountain-brush consists therein, that the bores through the bottom of the brush-head for feeding the paste or cream between the bristles are provided near the one end of the brush-head, where they are most accessible for cleaning purposes.

The transverse bores at the delivery-end of the hollow handle, which are provided in one embodiment of my fountain-brush, are not long and curved as in some other fountain-brushes, but they are extremely short and perpendicular to the longitudinal bore in the handle, so that they can be cleared likewise without any difficulty. In another embodiment of my invention, however, these transversal bores in the handle are dispensed with completely.

In order to make my invention entirely clear, I have shown in the accompanying drawing two embodiments, whereby in the different figures of the drawing the same reference characters designate identical or similar parts in the different constructions; thus:

Figure 1:
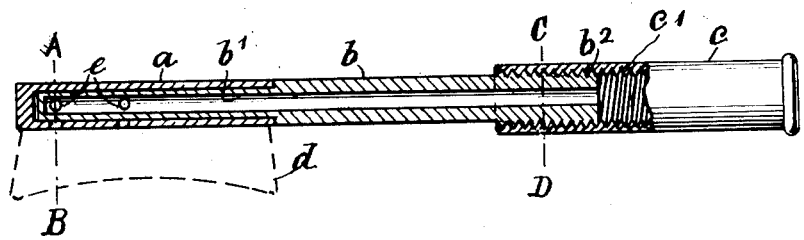
Figure 1 is a longitudinal section and side-view in some parts of the first embodiment.
Figure 2:
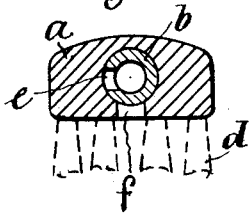
Figure 2 is an enlarged cross-section on the line A—B of Figure 1.
Figure 3:
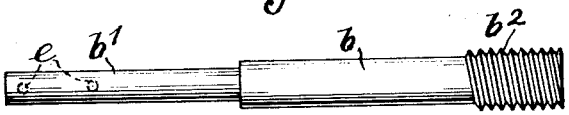
Figure 3 is a longitudinal front view of the handle.
Figure 4:
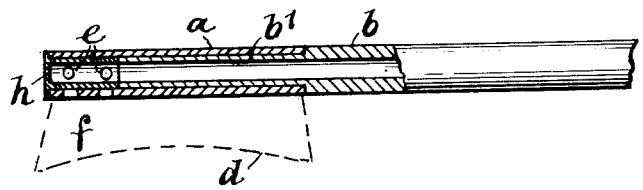
Figure 4 is a longitudinal section and side view in part of a slightly modified embodiment.
Figure 5:
Figure 5 is a cross section on the line C—D of Figure 1.
Figure 6:
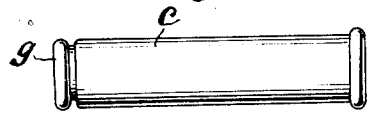
Figure 6 is a front view of the paste, or cream-container to be used in connection with my new and improved fountain-brush.

Referring now more particularly to the drawing, $b$ is the stem or handle of the fountain-brush, the delivery end of it, $b'$ is set off for slipping over it the brush-head $a$ with the bristles, as indicated by the dotted lines $d$. In the first embodiment of the invention, according to the Figures 1 to 3, the stem or handle is provided with an inner bore uniform in cross section, which bore extends over the whole length of the stem, only the delivery-end being closed by a little plug; close to this plug at the delivery-end two transverse holes $e$ are provided in the wall of the offset part $b'$ of the handle, whereas the bottom of the brush-head is provided with two corresponding holes $f$, adapted to be brought to register with the bores $e$ in the handle. In the embodiment of this invention, according to Figure 4, the delivery-end of the offset part $b'$ of the handle is somewhat shorter, and it has no transverse holes at all, while its bore is left open at the delivery-end. After slipping the bottom $a$ of the brush-head over the set-off handle-part $b'$, a breech-piece $h$ is inserted into the latter, which breech-piece has a sleeve-part, corresponding in its outer diameter and wall-thickness to the offset handle-part $b'$ so as to fit into the bore at the bottom of the brush-head; this breech-sleeve has further two holes $l$ adapted to register with the holes $f$ in the brush-head.

The grip-end of the handle is provided with an outer screw-thread $b2$, for cooperation with the cream or paste container. This cream or paste container $c$ is provided with an inner screw-thread $c'$ extending over its whole inner length, and it is closed at its one end by a bottom, and at its other end by a removable screw-plug $g$. When using it, the screw-plug $g$ is taken off, and the container $c$ is screwed on the screwthreaded end $b2$ of the brush handle.

In proportion as the cream or paste is delivered through the holes $e$ and $f$, the handle $b$, $b2$ is screwed deeper into the container c, thereby pressing a fresh supply of cream or paste through the bore of the handle to the bristles of the brush. In case the brush is not being used, then the brush-head a or the breech h is turned a little to bring the holes e and f out of register in order to prevent the cream or paste from being dried up.

It is to be understood that this invention is not limited to the structural details, described above and shown in the drawing, but it may be varied within the scope of protection defined by the following claims.

I claim:—

1. A fountain-brush, comprising in combination, a brush-handle provided with a smooth longitudinal bore of uniform cross section, and extending over the whole length of the handle, an outer screw-thread at the grip-end of the handle, means mounted upon the latter for containing and expelling a paste, a brush-head, consisting of bristles and of a bottom-part, turnably mounted on the delivery-end of the handle and adapted to close the delivery-end of the handle-bore the bottom part of the brush-head being provided with transverse holes therein close to the delivery-end of the longitudinal bore of the handle, and adapted to be set to a position of communication with the handle-bore to form outlet ports, or to a position of non-communication with the handle-bore.

2. A fountain-brush comprising in combination, a brush-handle with a smooth inner bore of uniform cross section an outer screw-thread at the grip-end of the handle, the wall of the handle being provided with a transverse hole close to the delivery-end of the handle-bore, a brush-head consisting of bristles and a bottom-part, adapted to be slipped over the delivery-end of the handle in close proximity to its longitudinal bore, the bottom part of the brush-head being near its end formed with a transverse hole to be brought into register with the transverse hole in the handle-wall, or to be set into position of non-communication with the said hole.

3. A fountain-brush, comprising in combination, a brush-handle provided with a smooth longitudinal bore of uniform cross section, and extending over the whole length of the handle, an outer screw-thread at the grip-end of the handle, a cylindrical container, for receiving paste, mounted upon and co-operating with the latter for expelling the said paste, the said container being closed at one end, a brush-head, consisting of bristles and of a bottom-part, turnably mounted on the delivery-end of the handle and adapted to close the delivery-end of the handle-bore, the bottom part of the brush-head being provided with transverse holes therein close to the delivery-end of the longitudinal bore of the handle, and adapted to be set to a position of communication with the handle-bore to form outlet ports, or to a position of non-communication with the handle-bore.

CHRISTIAN FREDERIK NIELSEN.